(12) United States Patent
Kitahara et al.

(10) Patent No.: US 7,216,329 B2
(45) Date of Patent: May 8, 2007

(54) AUTOMATIC CIRCUIT DESIGN APPARATUS, METHOD FOR AUTOMATICALLY DESIGNING A CIRCUIT, AND COMPUTER PROGRAM PRODUCT FOR EXECUTING AN APPLICATION FOR AN AUTOMATIC CIRCUIT DESIGN APPARATUS

(75) Inventors: Takeshi Kitahara, Kanagawa (JP); Masaaki Yamada, Kanagawa (JP); Naoyuki Kawabe, Kanagawa (JP); Masahiro Kanazawa, Kanagawa (JP); Katsuhiro Seta, Tokyo (JP); Toshiyuki Furusawa, Tokyo (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 446 days.

(21) Appl. No.: 10/816,640

(22) Filed: Apr. 2, 2004

(65) Prior Publication Data

US 2005/0097494 A1 May 5, 2005

(30) Foreign Application Priority Data

Oct. 30, 2003 (JP) .......................... P2003-370942

(51) Int. Cl.
G06F 17/50 (2006.01)
(52) U.S. Cl. .......................................... 716/17; 716/11
(58) Field of Classification Search ................ 716/9, 716/11, 17
See application file for complete search history.

(56) References Cited

U.S. PATENT DOCUMENTS

| | | | | |
|---|---|---|---|---|
| 6,490,708 | B2 * | 12/2002 | Cohn et al. | ...................... 716/4 |
| 6,493,856 | B2 * | 12/2002 | Usami et al. | .................. 716/10 |
| 6,586,982 | B2 | 7/2003 | Furusawa et al. | |
| 6,718,529 | B1 * | 4/2004 | Iwanishi | ......................... 716/6 |
| 6,912,697 | B2 * | 6/2005 | Shibata et al. | .................. 716/1 |
| 2002/0008545 | A1 | 1/2002 | Zama et al. | |
| 2002/0099989 | A1 | 7/2002 | Kawabe et al. | |
| 2002/0144223 | A1 | 10/2002 | Usami et al. | |
| 2003/0102898 | A1 | 6/2003 | Furusawa et al. | |
| 2003/0160634 | A1 | 8/2003 | Mushiga et al. | |
| 2003/0204828 | A1 * | 10/2003 | Iwanishi | ......................... 716/6 |
| 2004/0168143 | A1 * | 8/2004 | Kishibe | ....................... 716/10 |

FOREIGN PATENT DOCUMENTS

JP    2003-101397    4/2003

OTHER PUBLICATIONS

Usami et al., "Automated Selective Multi-Threshold Design For Ultra-Low Standby Applications," Proceedings of the 2002 International Symposium on Low Power Electronics and Design, pp. 202-206, Aug. 2002.

* cited by examiner

Primary Examiner—Jack Chiang
Assistant Examiner—Binh Tat
(74) Attorney, Agent, or Firm—DLA Piper US LLP

(57) ABSTRACT

An automatic circuit design apparatus includes a setting module configured to set an upper limit electric potential of a virtual ground line in a circuit to be designed, by use of a cell library for low-threshold cells, a cell library for high-threshold cells, and information of the circuit to be designed. A layout generator is configured to generate a layout based on the information, the cell library for low-threshold cells, and the cell library for high-threshold cells.

20 Claims, 13 Drawing Sheets

AUTOMATIC CIRCUIT DESIGN APPARATUS, METHOD FOR AUTOMATICALLY DESIGNING A CIRCUIT, AND COMPUTER PROGRAM PRODUCT FOR EXECUTING AN APPLICATION FOR AN AUTOMATIC CIRCUIT DESIGN APPARATUS

CROSS REFERENCE TO RELATED APPLICATION

This application is based upon and claims the benefit of priority from the prior Japanese Patent Application No. P2003-370942, filed on Oct. 30, 2003; the entire contents of which are incorporated herein by reference.

BACKGROUND OF THE INVENTION

1. Field of the Invention

The present invention relates to design technology of semiconductor integrated circuits and, more particularly, to an automatic circuit design apparatus, a method for automatically designing a circuit, a computer program product for executing an application for an automatic circuit design apparatus, for designing a circuit capable of decreasing leakage current of complementary metal-oxide-semiconductor (CMOS) transistors.

2. Description of the Related Art

A decrease in the threshold voltage of transistors progresses in proportion to a decrease in size of semiconductor integrated circuits and voltage value of the supply voltage. By the decrease in the threshold voltage, the leakage current of CMOS transistors increases. For power consumption limited equipment, such as mobile communication equipment, the increase of the leakage current becomes a serious problem. In order to decrease the leakage current, a technique has been proposed to configure a logic circuit by cells consisting of low-threshold-voltage transistors (hereinafter referred to as "low-threshold cells"), and to place switch cells between the low-threshold cells and a ground. Since the low-threshold cells can operate at a high speed, it is possible to reduce a path delay time.

Although the low-threshold cells can operate at a high speed, the leakage current quantity becomes large because the low-threshold cells are turned on by a small input voltage. On the other hand, cells composed of high-threshold-voltage transistors (hereinafter referred to as "high-threshold cells"), compared to the low-threshold cells, generate a small leakage current but operate at a low speed. The leakage current from the low-threshold cells is shut out because the switch cells go to an off state during a standby period. The switch cells go to an on state during a period of normal operation.

During the period of normal operation, the electric current at a ground goes to a maximum quantity when output signals of cells are changed to a low level. Accordingly, when many low-threshold cells are connected to a switch cell, a large electric current flows to the switch cell. When the large electric current flows to the switch cell, the discharge time of the electric current increases by on-resistance of the switch cell. As a result, since the output signals of the low-threshold cells connected to the switch cell does not go to a low level rapidly, the delay time of the low-threshold cells increases. Therefore, a path delay analysis taking into consideration the delay time caused by the increase of the discharge time of the low-threshold cells (hereinafter referred to as "a discharge delay") is required. The path delay analysis which considers the discharge delay requires a long time compared to normal path delay analysis. Although the discharge time can be reduced by increasing a switch cell area, the circuit scale of a designed circuit increases.

SUMMARY OF THE INVENTION

An aspect of the present invention inheres in an automatic circuit design apparatus encompassing, a setting module configured to set an upper limit electric potential of a virtual ground line in a circuit to be designed, by use of a cell library for low-threshold cells, a cell library for high-threshold cells, and information of the circuit to be designed, and a layout generator configured to generate a layout based on the information, the cell library for low-threshold cells, and the cell library for high-threshold cells.

Another aspect of the present invention inheres in a method for automatically designing a circuit encompassing, setting an upper limit electric potential of a virtual ground line in-a circuit to be designed, by use of a cell library for low-threshold cells, a cell library for high-threshold cells, and information of the circuit to be designed, and generating a layout based on the information, the cell library for low-threshold cells, and the cell library for high-threshold cells.

Still another aspect of the present invention inheres in a computer program product for executing an application for an automatic circuit design apparatus, the computer program product encompassing, instructions configured to set an upper limit electric potential of a virtual ground line in a circuit to be designed, by use of a cell library for low-threshold cells, a cell library for high-threshold cells, and information of the circuit to be designed, and instructions configured to generate a layout based on the information, the cell library for low-threshold cells, and the cell library for high-threshold cells.

DETAILED DESCRIPTION OF EMBODIMENTS

Figure 1:
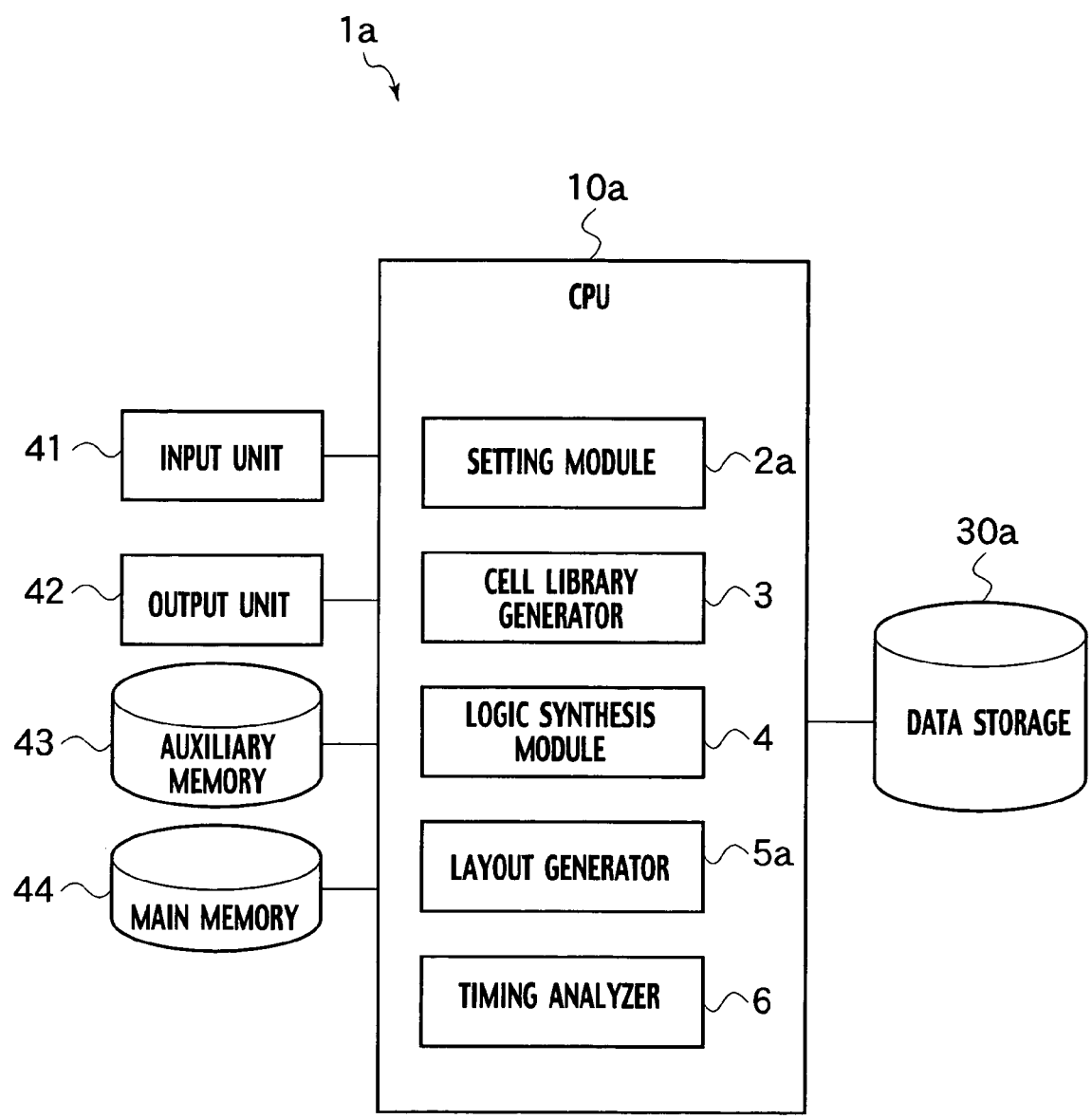
FIG. 1 is a block diagram showing an automatic circuit design apparatus according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

(FIRST EMBODIMENT)

As shown in FIG. 1, an automatic circuit design apparatus according to a first embodiment of the present invention includes a central processing unit (CPU) 10a, an input unit 41, an output unit 42, an auxiliary memory 43, a main memory 44, and a data storage 30a connected to the CPU 10a. The CPU 10a includes a setting module 2a, a cell library generator 3, a logic synthesis module 4, a layout generator 5a, and a timing analyzer 6. The setting module 2a sets an upper limit electric potential of a virtual ground line in the circuit to be designed, by use of a cell library for low-threshold cells, a cell library for high-threshold cells, and information of a circuit to be designed. Herein, the term "information" refers to, for example, a logical expression and the like described by use of hardware description language (HDL) in a register transfer level (RTL) design process. The cell library generator 3 generates the cell library for low-threshold cells by using the upper limit electric potential. Herein, the term "low-threshold cell" refers to a cell composed of transistors having a low-threshold voltage as compared to transistors in the high-threshold cell. The term "cell library" refers to, for example, information of layout data and parameters such as a delay time of each cell.

Furthermore, the logic synthesis module 4 provides a logic synthesis to the information of the circuit to be designed, and generates a net list. The layout generator 5a generates a layout based on the information of the circuit to be designed, the cell library for low-threshold cells, and the cell library for high-threshold cells. The timing analyzer 6 provides a timing analysis to the layout, based on the cell library for low-threshold cells, the cell library for high-threshold cells, and a timing constraint.

Figure 2:
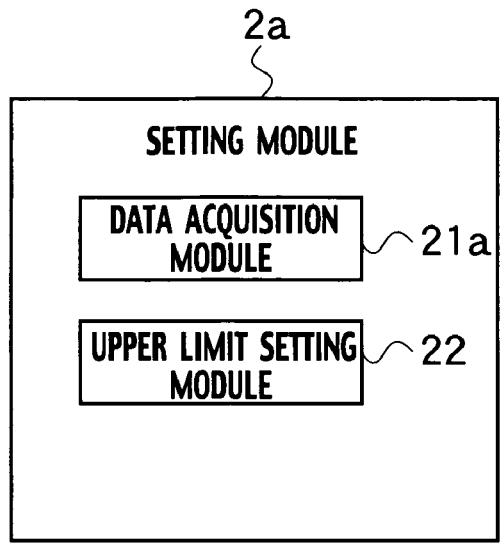
FIG. 2 is a block diagram showing a setting module according to the first embodiment.

As shown in FIG. 2, the setting module 2a includes a data acquisition module 21a, and an upper limit setting module 22. The data acquisition module 21a acquires information relating to the circuit to be designed, the upper limit electric potential, and the timing constraint. The upper limit setting module 22 sets an electric potential of a ground terminal in the low-threshold cell to the upper limit electric potential acquired by the data acquisition module 21a.

Figure 3:
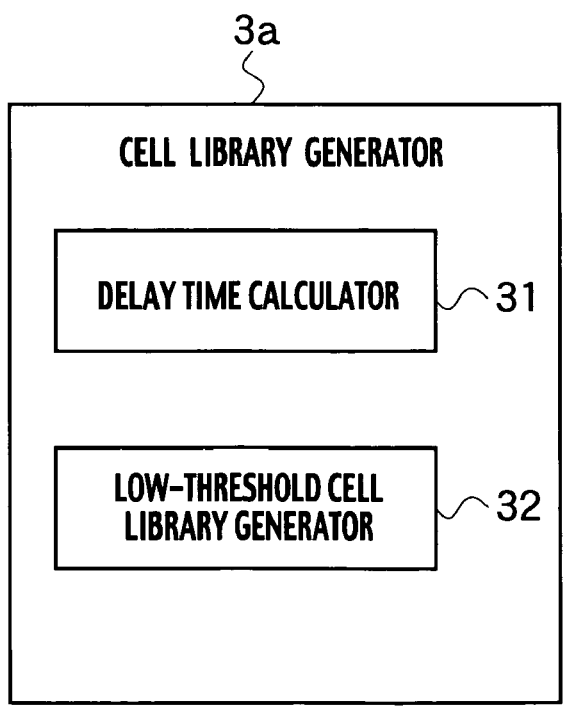
FIG. 3 is a block diagram showing a cell library generator according to the first embodiment.

As shown in FIG. 3, the cell library generator 3a includes a delay time calculator 31, and a low-threshold cell library generator 32. The delay time calculator 31 calculates a delay time of the low-threshold cell. The low-threshold cell library generator 32 generates the cell library for low-threshold cells based on the delay time calculated by the delay time calculator 31.

Figure 4:
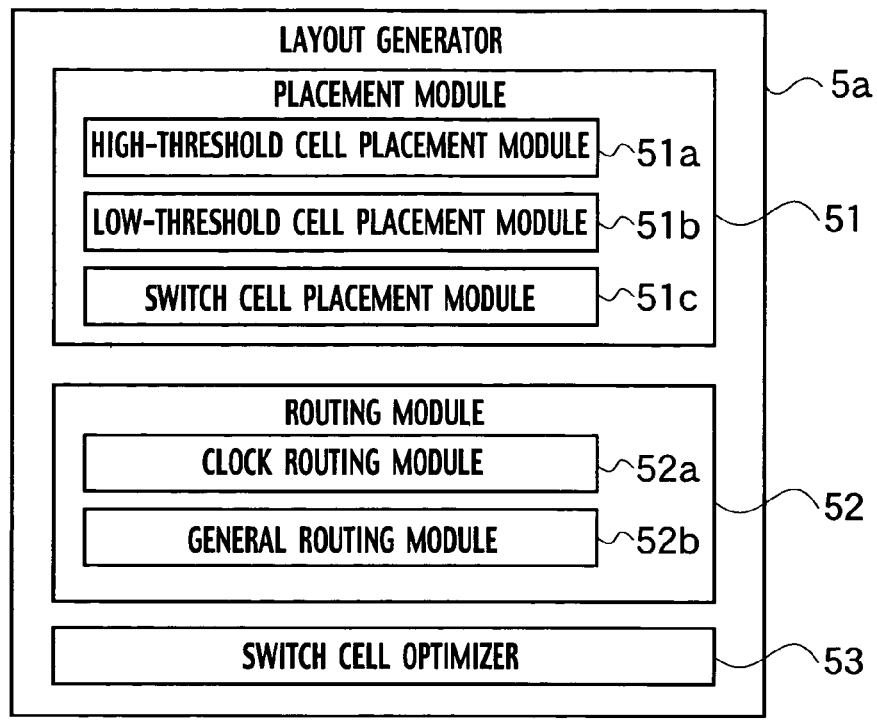
FIG. 4 is a block diagram showing a layout generator according to the first embodiment.

As shown in FIG. 4, the layout generator 5a includes a placement module 51, a routing module 52, and a switch cell optimizer 53. The placement module 51 places high threshold cells and low-threshold cells in the net list, based on the cell library for low-threshold cells, the cell library for high-threshold cells, and the timing constraint. As a result, placement data is generated by the placement module 51. The routing module 52 provides a routing process to the placement data, and generates the layout. The switch cell optimizer 53 optimizes the arrangement of switch cells to be connected to the virtual ground line when an electric potential of the virtual ground line exceeds the upper limit electric potential. The term "optimize" refers to, for example, an adjustment of both size and number of switch cells.

Moreover, the placement module 51 includes a high-threshold cell placement module 51a, a low-threshold cell placement module 51b, and a switch cell placement module 5ic. The high-threshold cell placement module 51a places flip-flops (F/Fs) and the high-threshold cells based on the net list. The low-threshold cell placement module 51b refers to the timing constraint, and replaces high-threshold cells which do not satisfy the timing constraint with low-threshold cells. The switch cell placement module 51c places a switch cell between a virtual ground line and a ground. The switch cell placement module Sic places a holder cell between a low-threshold cell having an output side connected to an input side of a high-threshold cell and a high voltage power supply.

The routing module 52 includes a clock routing module 52a and a general routing module 52b. The clock routing module 52a routes a clock path to the F/Fs. The general routing module 52b routes paths to the high-threshold cells, the low-threshold cells, and the switch cells.

Figure 5:
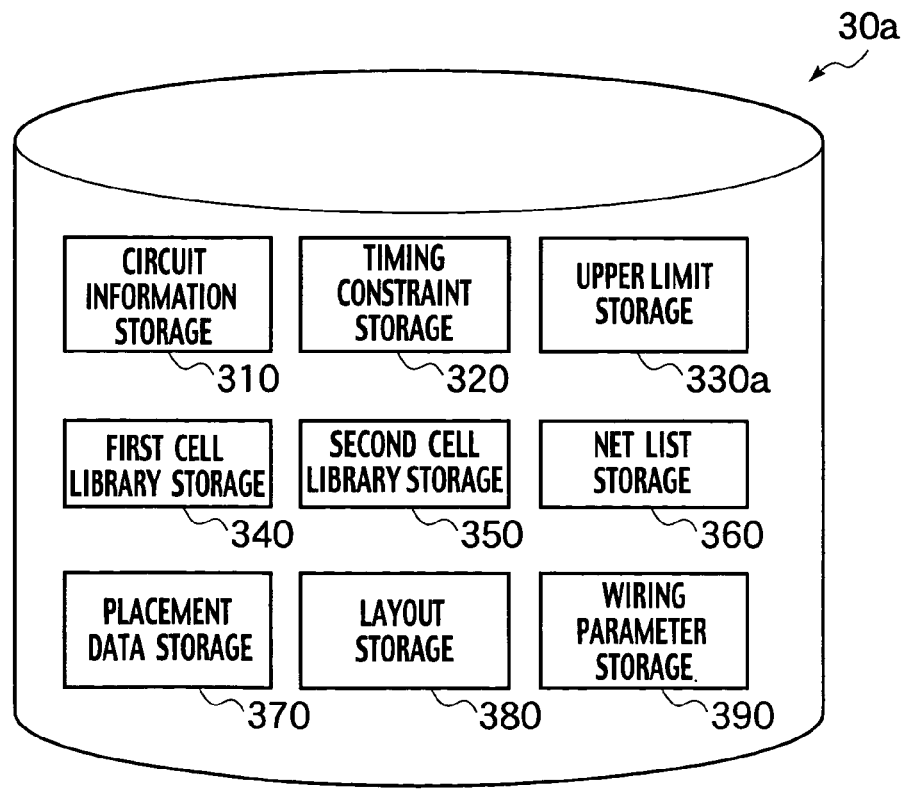
FIG. 5 is a block diagram showing a data storage according to the first embodiment.

The data storage 30a shown in FIG. 1 includes a circuit information storage 310, a timing constraint storage 320, an upper limit storage 330a, a first cell library storage 340, a second cell library storage 350, a net list storage 360, a placement data storage 370, a-layout storage 380, and a wiring parameter storage 390 as shown in FIG. 5.

The circuit information storage 310 stores the information of the circuit to be designed. The timing constraint storage 320 stores a timing constraint of the circuit to be designed. The upper limit storage 330a stores data of the upper limit electric potential of the virtual ground line. The first cell library storage 340 stores the cell library for high-threshold cells. The second cell library storage 350 stores the cell library for low-threshold cells generated by the low-threshold cell library generator 32 shown in FIG. 3. Or, the second cell library storage 350 stores the cell library for low-threshold cells. The net list storage 360 stores the net list of gate levels generated by the logic synthesis module 4 shown in FIG. 1. Alternatively, the net list is stored in the net list storage 360. The placement data storage 370 stores the placement data generated by the placement module 51 shown in FIG. 4. The layout storage 380 stores the layout data generated by the routing module 52 shown in FIG. 4. The wiring parameter storage 390 stores wiring parameters such as capacitance and resistance. However, the auxiliary memory 43 shown in FIG. 1 may store the aforementioned data instead of the data storage 30a.

A keyboard, a mouse or an authentication unit such as an optical character reader (OCR), a graphical input unit such as an image scanner, and/or a special input unit such as a voice recognition device can be used as the input unit 41 shown in FIG. 1. A display such as a liquid crystal display or a cathode-ray tube (CRT) display, a printer such as an ink-jet printer or a laser printer, and the like can be used as the output unit 42. The main memory 44 includes a read only memory (ROM) and a random access memory (RAM). The ROM serves as a program, memory or the like which stores a program to be executed by the CPU 10a. The RAM temporarily stores the program for the CPU 10a and data which are used during execution of the program, and also serves as a temporary data memory to be used as a work area.

The automatic circuit design apparatus shown in FIG. 1 includes a data storage controller and an input/output (I/O) controller (not illustrated). The data storage controller provides retrieval, reading, and writing to the data storage 30a. The I/O controller receives data from the input unit 41, and transmits the data to the CPU 10a. The I/O controller is provided as an interface for connecting the input unit 41, the output unit 42, the auxiliary memory 43, a reader for a memory unit such as a compact disk-read only memory (CD-ROM), a magneto-optical (MO) disk or a flexible disk, or the like to CPU 10a. From the viewpoint of a data flow, the I/O controller is the interface for the input unit 41, the output unit 42, the auxiliary memory 43 or the reader for the external memory with the main memory 44. The I/O controller receives a data from the CPU 10a, and transmits the data to the output unit 42 or auxiliary memory 43 and the like.

Figure 7:
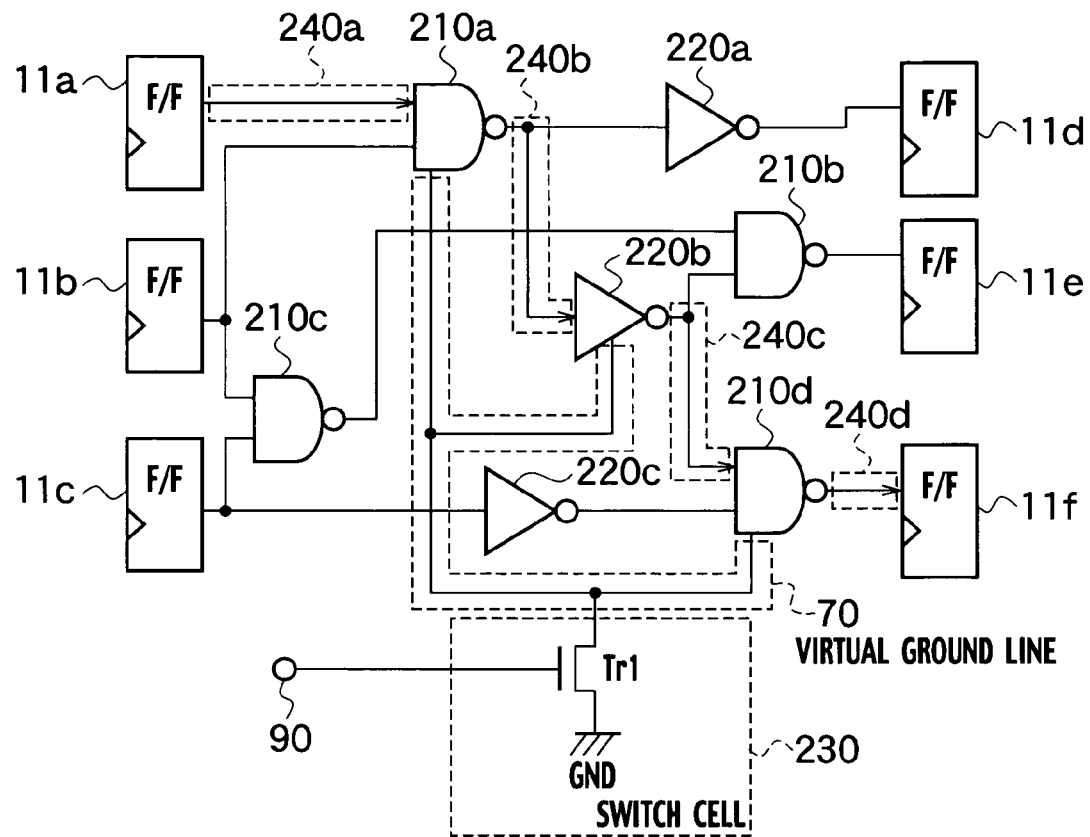
FIG. 7 is a circuit diagram of a logic circuit for explaining the method according to the first embodiment.
Figure 8:
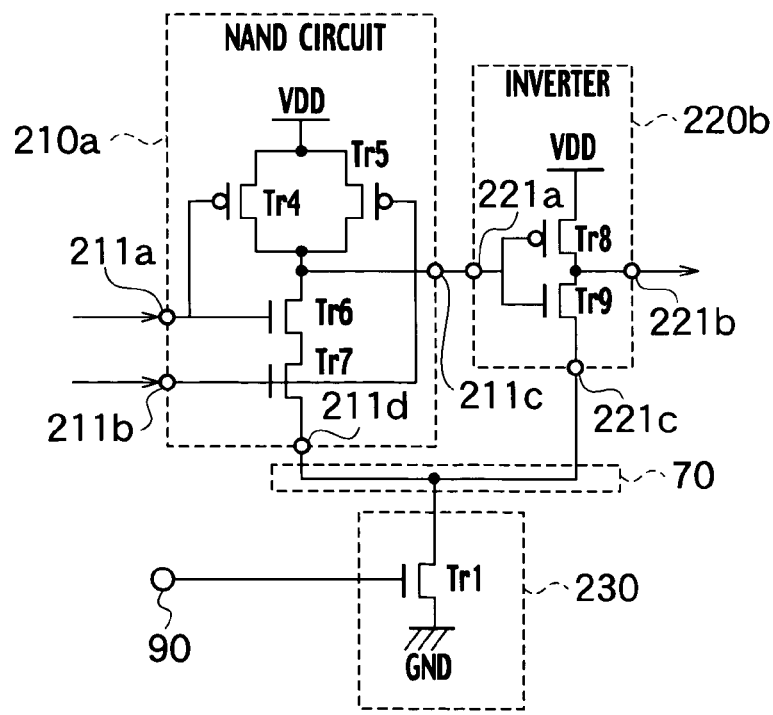
FIG. 8 is a circuit diagram showing a part of internal circuit of the logic circuit shown in FIG. 7.

Next, a method for automatically designing a circuit according to the first embodiment will be described with reference to FIG. 1 to FIG. 8. In explaining of the method according to the first embodiment, it is assumed that the automatic circuit design apparatus 1a provides an automatic design to a logic circuit shown in FIG. 7. The logic circuit shown in FIG. 7 includes F/Fs 11a to 11f, NAND circuits 210a to 210d, inverters 220a to 220c, and a switch cell 230. The NAND circuits 210a and 210d, and the inverter 220b are configured as low-threshold cells. The switch cell 230 (Tr1) has a drain connected to a virtual ground line 70, a gate connected to a switch terminal 90, and a source connected to a ground GND. In normal operation, the switch cell 230 goes to the on state, based on an enable signal supplied by an external circuit through the switch terminal 90. As shown in FIG. 8, the NAND circuit 210a shown in FIG. 7 is a two-input NAND circuit including input terminals 211a and 211b, transistors Tr4 to Tr7, an output terminal 211c, and a ground terminal 211d. The inverter 220b shown in FIG. 7 is a CMOS inverter including input terminal 221, transistors Tr8 and Tr9, an output terminal 221b, and a ground terminal 221c.

Figure 6:
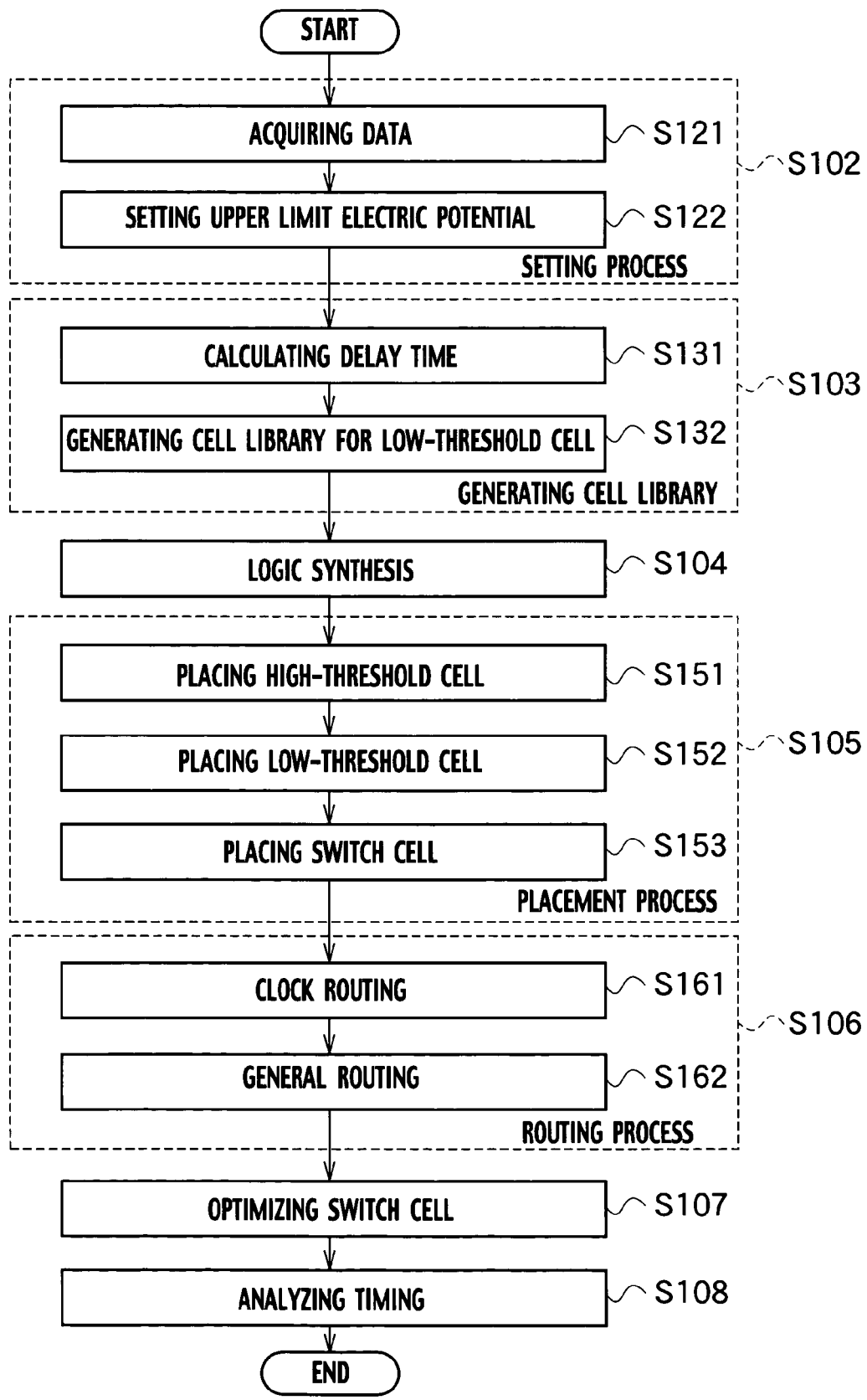
FIG. 6 is a flow chart showing a method for designing a circuit automatically according to the first embodiment.

(A) In step S121 of FIG. 6, the data acquisition module 21a shown in FIG. 2 acquires the information of the circuit to be designed stored in the circuit information storage 310 shown in FIG. 5. Furthermore, the data acquisition module 21a acquires the timing constraint, the upper limit electric potential data, and the cell library for high-threshold cells from the timing constraint storage 320, the upper limit storage 330a, the first cell library storage 340, respectively. The upper limit electric potential data acquired by the data acquisition module 21a is supplied to the upper limit setting module 22 shown in FIG. 2. The information of the circuit to be designed acquired by the data acquisition module 21a is supplied to the upper limit setting module 22 and the logic synthesis module 4 shown in FIG. 1. The timing constraint acquired by the data acquisition module 21a is supplied to the logic synthesis module 4, the timing analyzer 6, the low-threshold cell placement module 51b, and switch cell optimizer 53. The cell library for high-threshold cells is supplied to the timing analyzer 6, and high-threshold cell placement module 51a shown in FIG. 4.

(B) In step S122, the upper limit setting module 22 sets the upper limit electric potential of the virtual ground line 70 shown in FIG. 7 by use of the upper limit electric potential data and the information of the circuit to be designed. As a result, electric potentials of ground terminals 211d and 221c shown in FIG. 8 are set to the upper limit electric potential. In this step, the F/Fs 11a to 11f, the NAND circuits 210a to 210d, the inverters 220a to 220c, and the switch cell 230 shown in FIG. 7 and FIG. 8 are not provided because logic synthesis has not yet been performed.

(C) In step S131, the delay time calculator 31 shown in FIG. 3 calculates delay time of the low-threshold cell. The delay time calculator 31, in the circuit example of FIG. 8, calculates the delay times of the NAND circuit 210a and the inverter 220b based on the electric potentials set in the ground terminals 211d and 221c. Furthermore, the delay time calculator 31 calculates delay times of low-threshold cells corresponding to all high-threshold cells such as inverters, AND circuits, OR circuits, NAND circuits, NOR circuits, and EOR circuits.

(D) In step S132, the low-threshold cell library generator 32 shown in FIG. 3 generates a cell library for low-threshold cells in accordance with the delay times calculated by the delay time calculator 31. The cell library for low-threshold cells is stored in the second cell library storage 350 shown in FIG. 5. The steps S131 and S132 are unnecessary when the cell library for low-threshold cells is previously prepared, i.e. stored in advance.

(E) In step S104, the logic synthesis module 4 shown in FIG. 1 subjects the information of the circuit to be designed to the logic synthesis. As a result, the gate level net list shown in FIG. 7 is generated. The net list generated by the logic synthesis module 4 is stored in the net list storage 360. However, the step S104 is unnecessary when the net list is previously prepared, i.e. stored in advance.

(F) In step S151, the high-threshold cell placement module 51a places high-threshold cells based on the net list. As a result, the NAND circuits 210a to 210d and the inverters 220a to 220c shown in FIG. 7 are placed or positioned as the high-threshold cells. Furthermore, in step S152, the low-threshold cell placement module 51b determines whether the result of the step S151 satisfies the timing constraint. For example, the low-threshold cell placement module 51b replaces the NAND circuits 210a and 210d and the inverter 220b with the low-threshold cells when a critical path, that is, a path between the F/F 11a and the F/F 11f does not satisfy the timing constraint. In step S153, the switch cell placement module 51c places and allots the switch cell 230 to the low-threshold cells, that is, the NAND circuit 210a and 210d, and the inverter 220b. In the logic circuit shown in FIG. 7, the switch cell 230 is connected to a low-threshold cell group consisting of plural low-threshold cells, that is, the NAND circuit 210a and 210d, and the inverter 220b. As a result, the placement data is generated, and the placement data is stored in the placement data storage 370 shown in FIG. 5. Instead of carrying out step S151 and then step S152, step S152 may be carried out before or in parallel with step S151.

(G) In step S161, the clock routing module 52a shown in FIG. 4 routes clock paths to, for example, the F/Fs 11a to 11f shown in FIG. 7. Moreover, in step S162, the general routing module 52b shown in FIG. 4 routes paths to, for example, the NAND circuits 210a to 210d, the inverters 220a to 220c, and the switch cell 230. As a result, the layout data is generated, and the layout data is stored in the layout storage 380 shown in FIG. 5.

(H) In step S107, the switch cell optimizer 53 optimizes the arrangement of the switch cell 230 when the electric potential of the virtual ground line 70 exceeds the upper limit electric potential. Since substantial values of resistance and capacitance of each wiring including the virtual ground line 70 are known after the routing process, an analysis of increased electrical potential of the virtual ground line 70 and the optimization of switch cells is performed with high precision.

(I) In step S 108, the timing analyzer 6 shown in FIG. 1 provides timing analysis to the layout data stored in the layout storage 380 based on the cell library for high-threshold cells, the cell library for low-threshold cells, and the wiring parameter. In FIG. 7, when the delay times of wirings 240a, 240b, 240c, and 240d are represented by "T_wire1", "T_wire2", "T_wire3", and "T_wire4" respectively, the delay times of the NAND circuits 210a and 210d are represented by "T_nand1" and "T_nand2" respectively, the delay time of the inverter 220b is represented by "T_not", the path delay time "Tdelay" is expressed by:

$$T\text{delay} = T\_\text{wire1} + T\_\text{nand1} + T\_\text{wire2} + T\_\text{not} + T\_\text{wire3} + T\_\text{nand2} + T\_\text{wire4} \quad (1)$$

When the timing analysis is finished, the automatic circuit design process is completed.

As is apparent from the equation (1), it is unnecessary to perform path delay analysis considering the discharge delay in the timing analysis process by setting the upper limit electric potential of the virtual ground line before generating the cell library. The path delay analysis considering the discharge delay requires a long time. As described above, according to the first embodiment, it is possible to reduce the time needed for the timing analysis. Furthermore, it is possible to minimize an increase of switch cell area and to reduce the circuit scale of the entire designed circuit by optimizing arrangement of the switch cell only when the electric potential of the virtual ground line exceeds an upper limit electric potential. Accordingly, it is possible to design a semiconductor integrated circuit, in a short time, which has a small circuit scale and operate with low power consumption.

(First Modification of First Embodiment)

Figure 9:
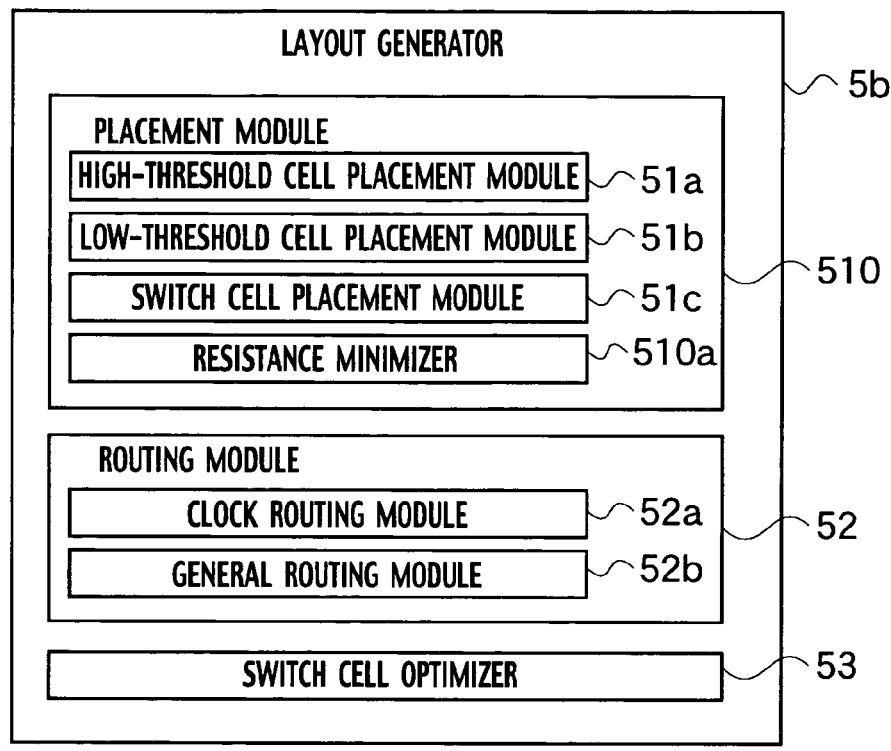
FIG. 9 is a block diagram showing a layout generator according to a first modification of the first embodiment of the present invention.

As a first modification of the first embodiment of the present invention, as shown in FIG. 9, a placement module 510 may further include a resistance minimizer 510a configured to shorten a distance between a switch cell and low-threshold cells, connected to a common virtual ground line. That is, the resistance minimizer 510a minimizes wiring resistance and wiring capacitance of the virtual ground line by shortening the distance between the switch cell and the low-threshold cells connected to the common virtual ground line. Since wirings including the virtual ground line are not present in the placement process, the resistance minimizer 510a calculates resistance values and capacitance values of the wirings by a virtual estimate.

Figure 10:
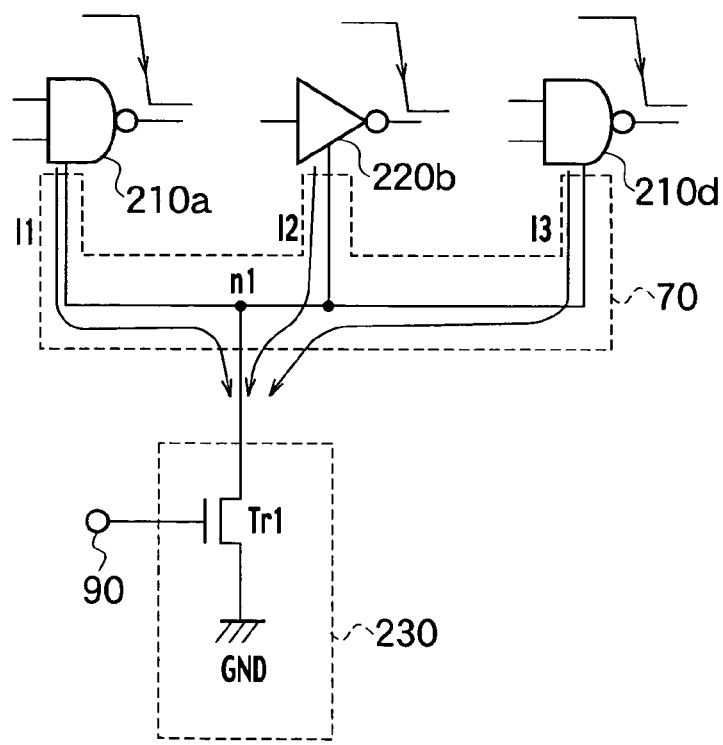
FIG. 10 is a circuit diagram for explaining the function of the layout generator according to the first modification of the first embodiment.

For example, the sum total of discharge currents I1, I2, and I3 shown in FIG. 10 becomes a maximum when respective output signals of NAND circuits 210a and 210d, and a inverter 220b connected to a virtual ground line 70 go to a low level at the same time. When wiring resistance of the virtual ground line 70 is large, it becomes difficult for discharge currents I1, I2 and I3 to flow to the switch cell 230. As a result, respective delay times of NAND circuits 210a and 210d, and the inverter 220b increase.

Figure 11:
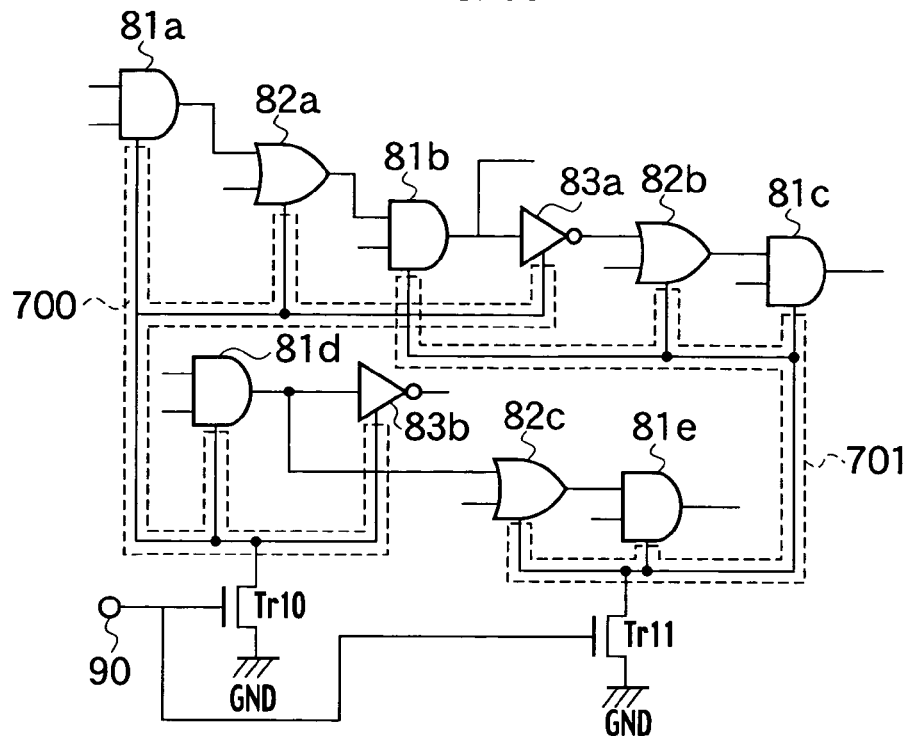
FIG. 11 is a circuit diagram for explaining a function of the layout generator according to the first modification of the first embodiment.

Therefore, in a circuit example shown in FIG. 11, the resistance minimizer 510a shortens the distance between a switch cell Tr10 and other circuits, i.e., AND circuits 81a and 81d, inverters 83a and 83b, and an OR circuit 82a. Similarly, the resistance minimizer 510a shortens the distance between a switch cell Tr11 and AND circuits 81b, 81c and 81e, and OR circuits 82b and 82c. As a result, respective wiring resistances of the virtual ground lines 700 and 701 are decreased. It is possible to prevent an increase of the discharge delay because it is possible to reduce wiring resistance of the virtual ground line.

(Second Modification of First Embodiment)

Figure 12:
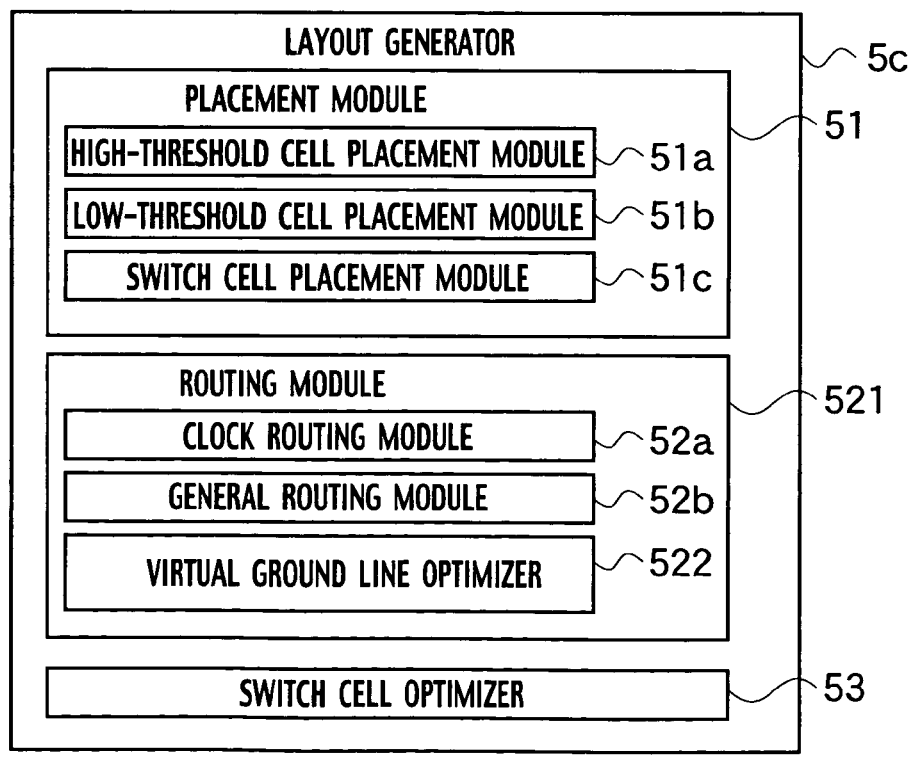
FIG. 12 is a block diagram showing a layout generator according to a second modification of the first embodiment.
Figure 13:
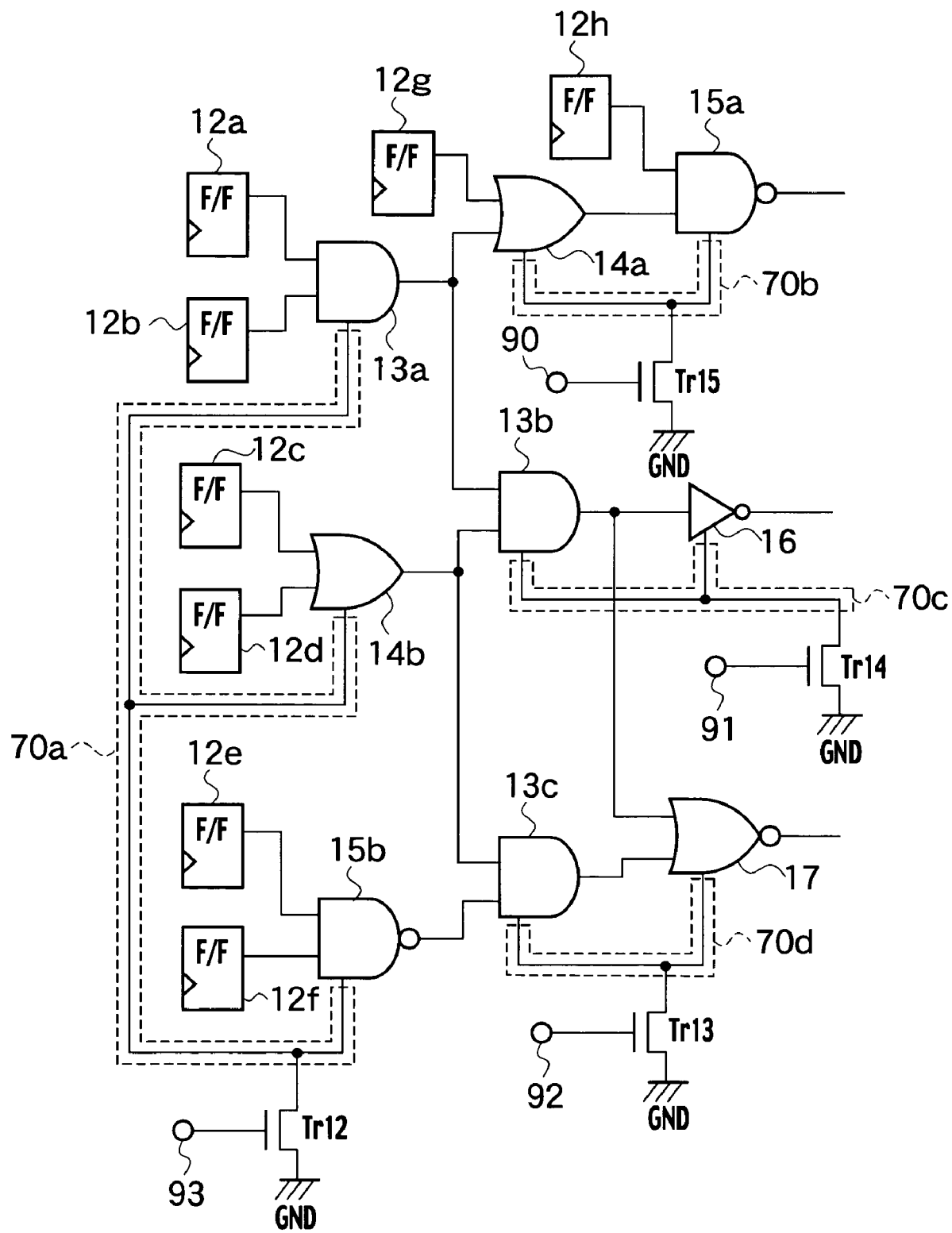
FIG. 13 is a circuit diagram for explaining a function of the layout generator according to the second modification of the first embodiment.

As a second modification of the first embodiment of the present invention, as shown in FIG. 12, a routing module 521 may further include a virtual ground line optimizer 522 configured to change a connection of a virtual ground line connected to same-stage low-threshold cells to a connection to other-stage low-threshold cells. In a logic circuit shown in FIG. 13, an AND circuit 13a, an OR circuit 14b, and a NAND circuit 15b are placed in the first stage. AND circuits 13b and 13c, and an OR circuit 14a are placed in the second stage. A NAND circuit 15a, an inverter 16, and a NOR circuit 17 are placed in the third stage. The AND circuit 13a, the OR circuit 14b, and the NAND circuit 15b operate in synchronization with each other. The AND circuits 13b and 13c, and the OR circuit 14a operate in synchronization with each other. The NAND circuit 15a, the inverter 16, and the NOR circuit 17 operate in synchronization with each other. Furthermore, the logic circuit shown in FIG. 13 includes F/Fs 12a to 12h, switch cells Tr12 to Tr15, and switch terminals 90 to 93.

Figure 14:
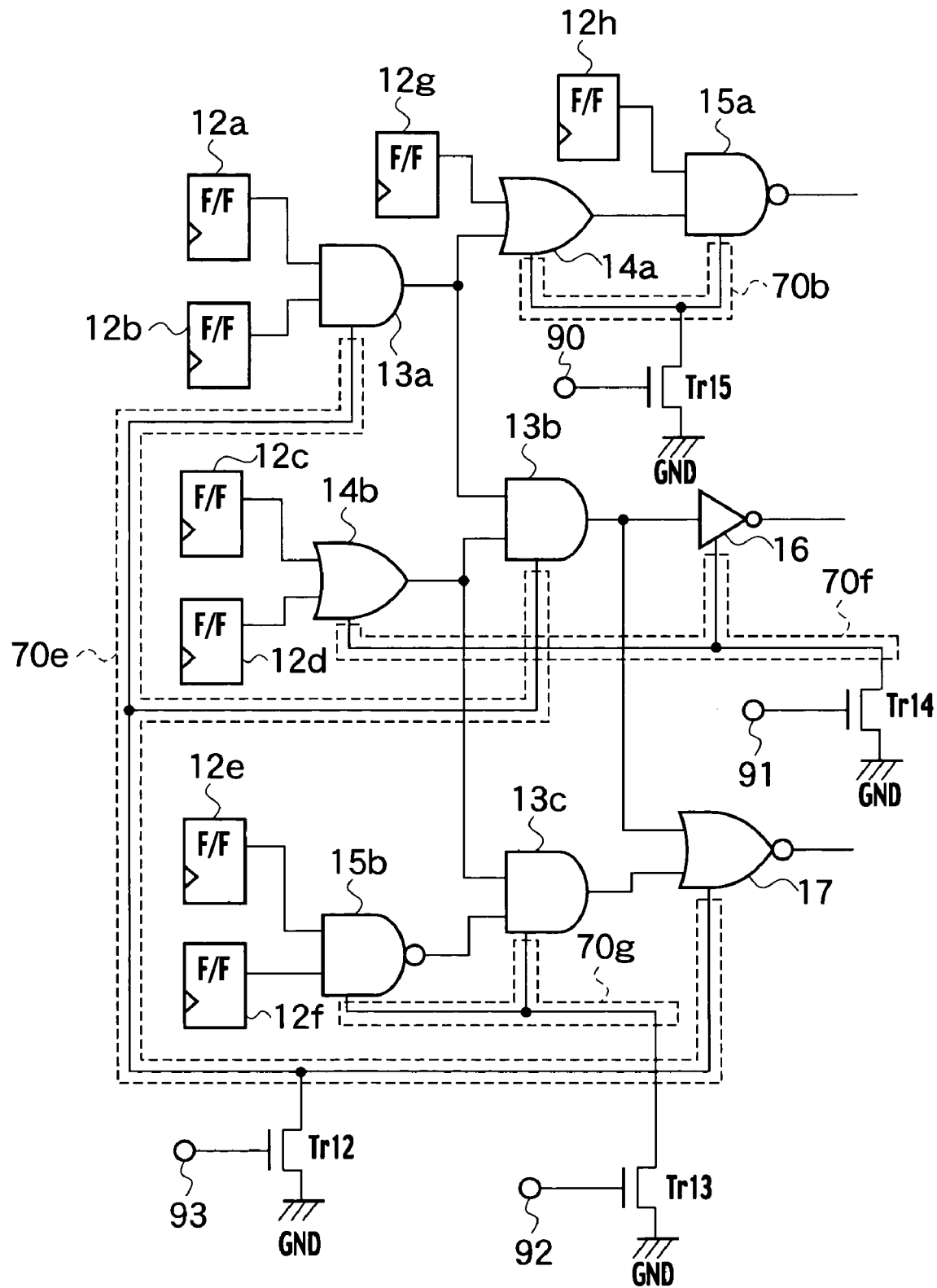
FIG. 14 is a circuit diagram for explaining the function of the layout generator according to the second modification of the first embodiment.

Since a cell group operating in synchronization with each other, i.e., the AND circuit 13a, the OR circuit 14b, and the NAND circuit 15b frequently discharge at the same time, an electric potential of a virtual ground line 70a increases. On the other hand, since virtual ground lines 70b, 70c, and 70d are connected to cells existing at different stage, it is hard for the virtual ground lines 70b, 70c, and 70d to increase the electric potential. Therefore, the virtual ground line optimizer 522 changes the routing of the virtual ground line 70a. As a result, as shown in FIG. 14, a virtual ground line 70e is connected to different-stage low-threshold cells, i.e. the AND circuit 13a and 13b, and the NOR circuit 17.

(Second Embodiment)

Figure 15:
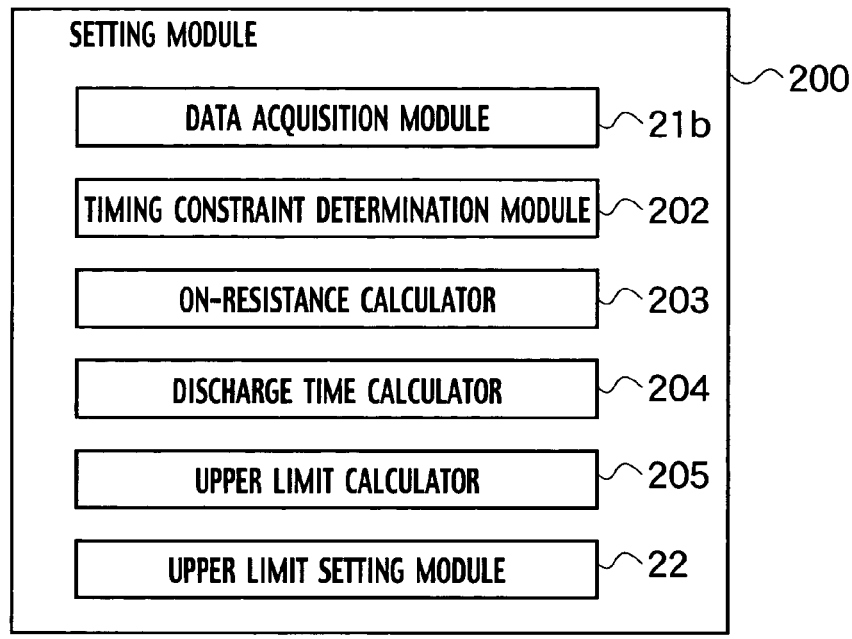
FIG. 15 is a block diagram showing a setting module according to a second embodiment of the present invention.

As shown in FIG. 15, an automatic circuit design apparatus according to a second embodiment of the present invention is different from the setting module 2a shown in FIG. 2 in that a setting module 200 further includes a timing constraint determination module 202, an on-resistance calculator 203, a discharge time calculator 204, and an upper limit calculator 205. The data acquisition module 21b acquires the circuit information, the timing constraint, and the wiring parameter.

Moreover, the timing constraint determination module 202 estimates the number of high-threshold cells and low-threshold cells based on the circuit information, and calculates an allowable delay time of each cell. The on-resistance calculator 203 calculates an on-resistance of switch cells, based on a transistor characteristic and a cell library for high-threshold cells. The discharge time calculator 204 calculates a discharge time of the low-threshold cells based on the wiring parameter and the on-resistance, and calculates the delay time of the low-threshold cells from the discharge time. The upper limit calculator 205 compares the allowable delay time with the delay time, and calculates the upper limit electric potential.

Figure 16:
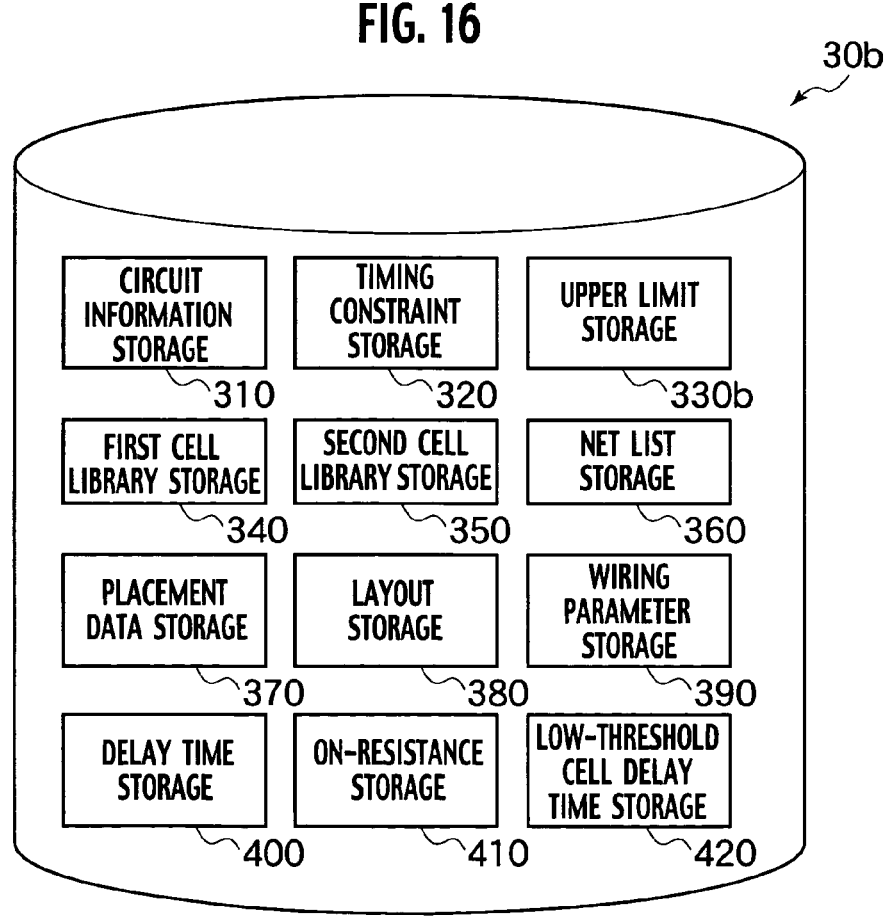
FIG. 16 is a block diagram showing a data storage according to the second embodiment.

As shown in FIG. 16, a data storage 30b is different from the data storage 30a shown in FIG. 5 in that the data storage 30b further includes a delay time storage 400, an on-resistance storage 410, and a low-threshold cell delay time storage 420. The delay time storage 400 stores the allowable delay time calculated by the timing constraint determination module 202. The on-resistance storage 410 stores the on-resistance calculated by the on-resistance calculator 203. The low-threshold cell delay time storage 420 stores discharge time of the low-threshold cells calculated by the discharge time calculator 204. The upper limit storage 330b stores the upper limit electric potential calculated by the upper limit-setting module 205. Other configurations are similar to the automatic circuit design apparatus 1a shown in FIG. 1.

Next, a method for automatically designing a circuit according to the second embodiment will be described with reference to FIG. 15 to FIG. 17. Repeated descriptions for the same processing according to the second embodiment which are the same as the first embodiment are omitted.

Figure 17:
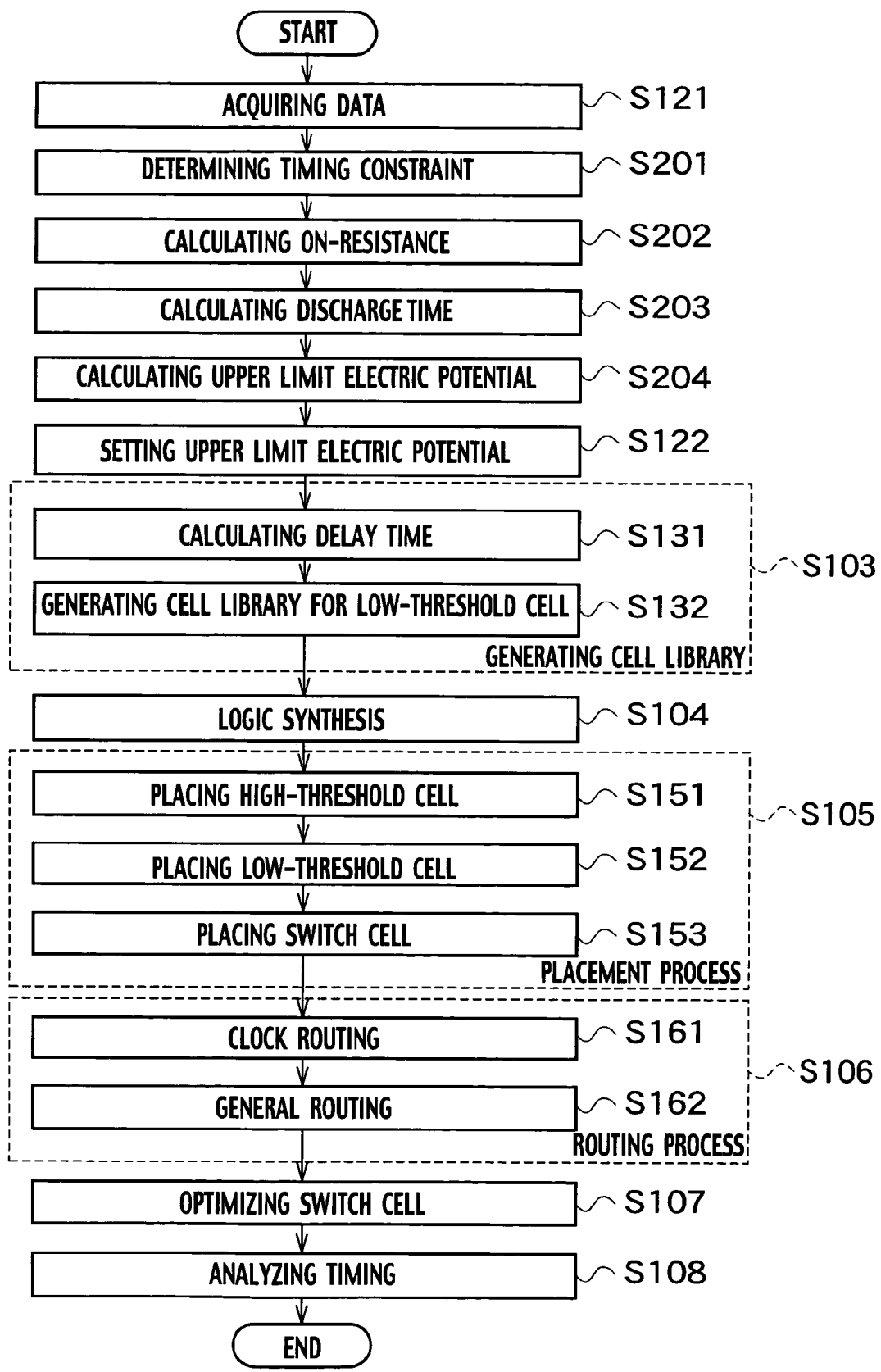
FIG. 17 is a flow chart showing a method for designing a circuit automatically according to the second embodiment.

(A) In step S121 of FIG. 17, the data acquisition module 21b shown in FIG. 15 acquires the circuit information, the timing constraint, and the wiring parameters from the circuit information storage 310, the timing constraint storage 320, and the wiring parameter storage 390, respectively.

(B) In step S201, the timing constraint determination module 202 shown in FIG. 15 estimates the number of high-threshold cells and low-threshold cells based on the circuit information, and calculates the allowable delay time of each cell.

(C) In step S202, the on-resistance calculator 203 calculates the on-resistance of switch cells, based on the transistor characteristic and the cell library for high-threshold cells.

(D) In step S203, the discharge time calculator 204 calculates the discharge time of the low-threshold cells based on the wiring parameters and the on-resistance. Furthermore, the discharge time calculator 204 calculates the delay time of the low-threshold cells from the discharge time.

(E) In step S204, the upper limit-setting module 205 compares the allowable delay time calculated in step S201 with the delay time calculated in step S203, and calculates the upper limit electric potential of the virtual ground line.

As described above, according to the second embodiment, it is possible to set an upper limit electric potential of a virtual ground line to an appropriate electric potential. Therefore, it is possible to prevent the electric potential of the virtual ground line from exceeding the upper limit electric potential. Furthermore, it is possible to design a semiconductor integrated circuit, in short a time, having a small circuit scale and operating with low power consumption.

(Third Embodiment)

Figure 18:
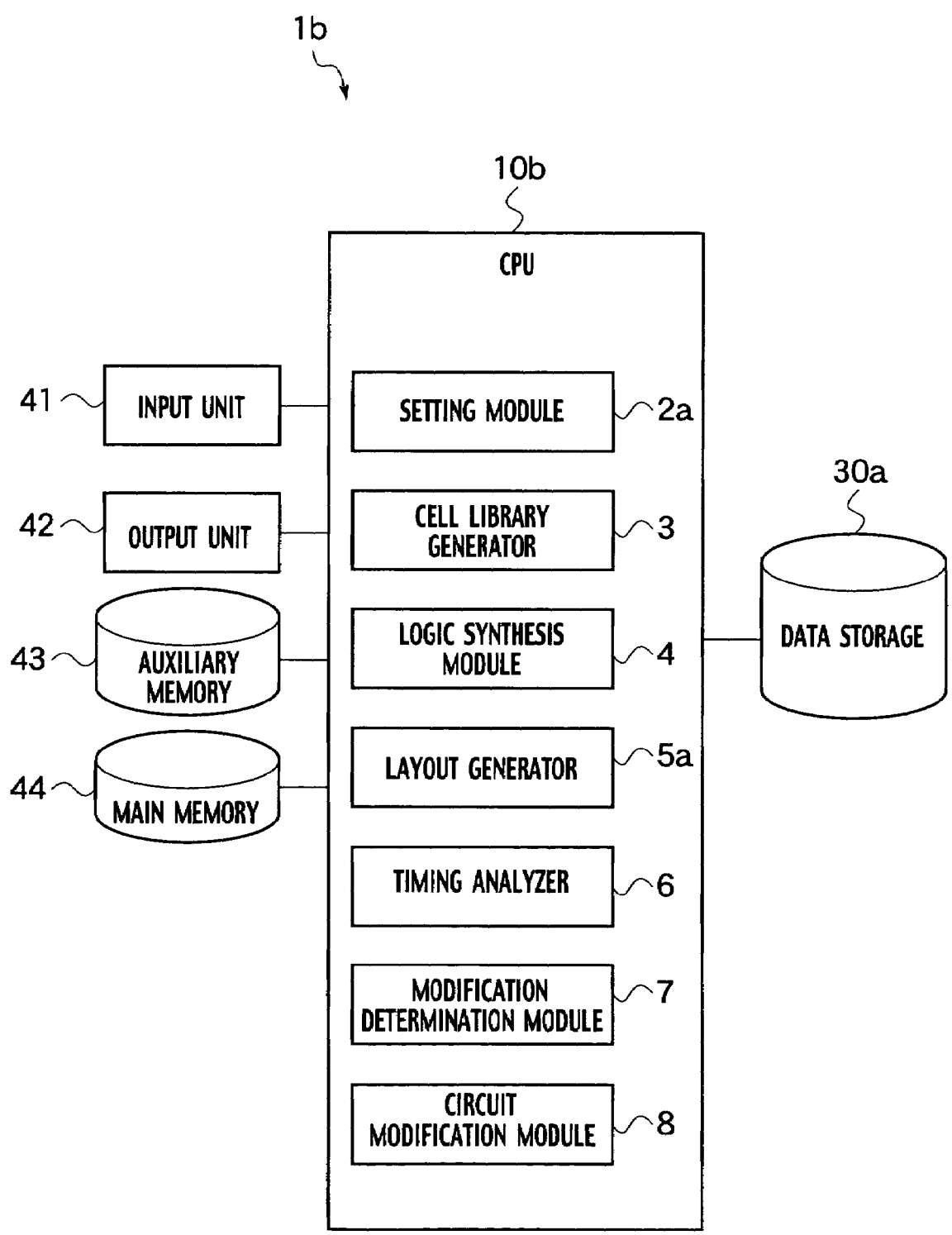
FIG. 18 is a block diagram showing an automatic circuit design apparatus according to a third embodiment of the present invention.

As shown in FIG. 18, an automatic circuit design apparatus 1b according to a third embodiment of the present invention is different from the CPU 10a shown in FIG. 1 in that a CPU 10b further includes a modification determination module 7 and a circuit modification module 8. The modification determination module 7 determines whether there is need to modify a part of the layout in accordance with the timing analysis. The circuit modification module 8 adds some cells to a net list, or removes some cells from the net list in accordance with the timing analysis. Other configurations are similar to the automatic circuit design apparatus 1a shown in FIG. 1.

Next, a method for automatically designing a circuit according to the third embodiment will be described with reference to FIG. 18 to FIG. 19. Repeated descriptions for the same processing according to the third embodiment which are the same as the first embodiment are omitted.

Figure 19:
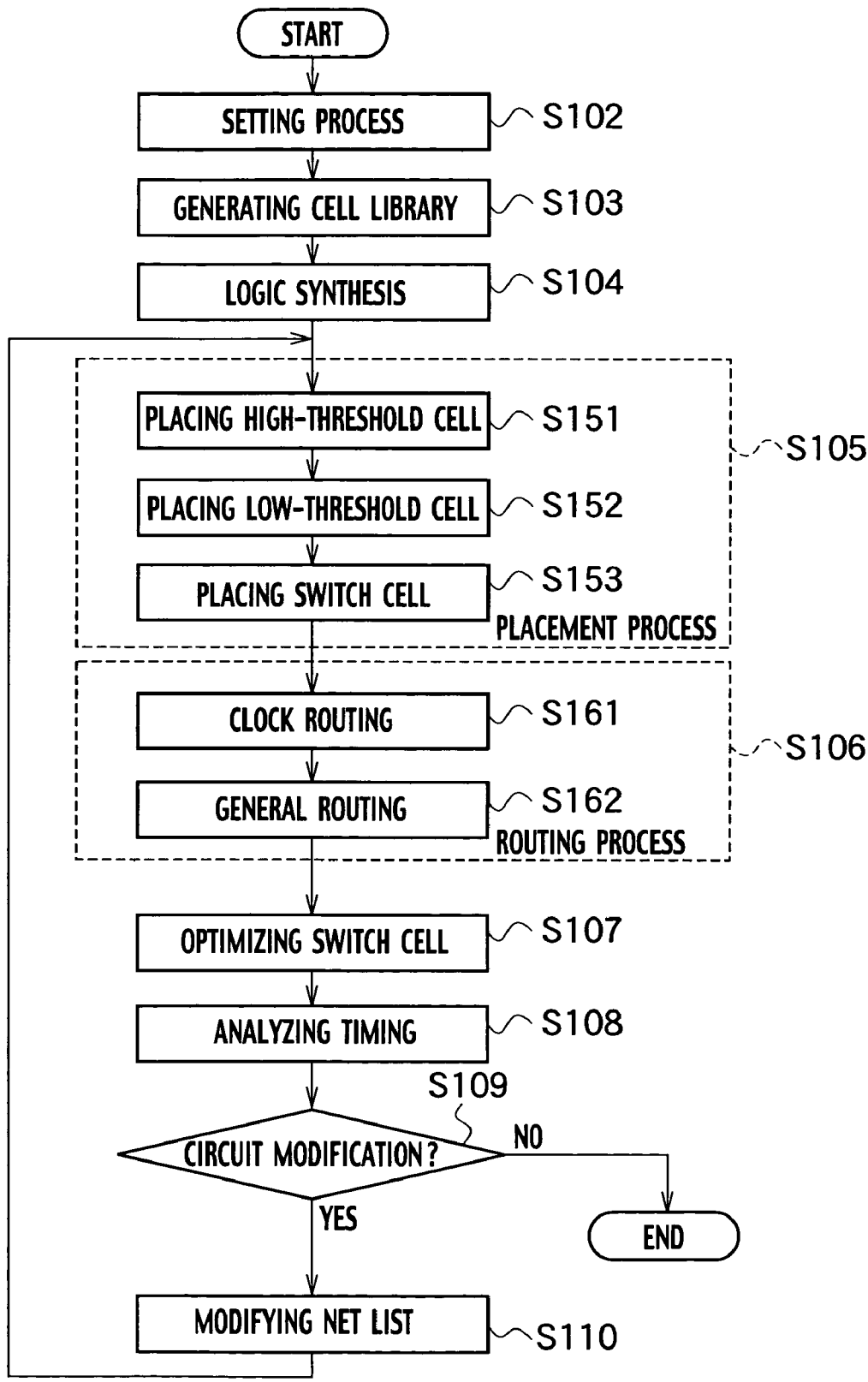
FIG. 19 is a flow chart showing a method for designing a circuit automatically according to the third embodiment.

(A) In step S109 of FIG. 19, the modification determination module 7 determines whether to modify a part of the layout in accordance with the result of step S108. When it is determined that there is a need to modify a part of the layout, the procedure advances to step S110. When it is determined that there is no need to modify a part of the layout, the procedure is completed.

(B) In step S110, the circuit modification module 8 adds some cells to a net list or removes some cells from the net list. Then, the procedure returns to step S151, and the layout is generated with respect to the modified net list.

As described above, according to the third embodiment, it is possible to generate a layout with respect to a modified net list, when it is modified in accordance with the timing analysis. Accordingly, it is possible to design a semiconductor integrated circuit, in a short time, having a small circuit scale and operating with low power consumption.

(Other Embodiments)

Various modifications will become possible for those skilled in the art after receiving the teachings of the present disclosure without departing from the scope thereof.

In the first to third embodiments described above, the example has been described, in which the low-threshold cell library generator 32 shown in FIG. 3 generates the cell library for low-threshold cells corresponding to the cell library for high-threshold cells. However, the low-threshold cell library generator 32 may generate a cell library for low-threshold cells with respect to some cells that are frequently used.

Furthermore, in the first to third embodiments, the example has been described, in which the switch cell optimizer 53 shown in FIG. 4 optimizes the arrangement of the switch cells after the routing process. However, the switch cell optimizer 53 may optimize the arrangement of the switch cells after the placement process. Or, the switch cell optimizer 53 may optimize the arrangement of each of the switch cells after the placement process and after routing process.

Moreover, in the first to third embodiments, the example has been described, in which the switch cell placement module 51c connects a switch cell to a low-threshold cell group consisting of plural low-threshold cells. However, switch cell placement module Sic may connect a switch cell to a low-threshold cell. Or, the switch cell placement module Sic may connect a plurality of switch cells to a virtual ground line when the low-threshold cell group is connected to the virtual ground line.

What is claimed is:

1. An automatic circuit design apparatus comprising:
   a setting module configured to set an upper limit electric potential of a virtual ground line in a circuit to be designed, by use of a cell library for low-threshold cells, a cell library for high-threshold cells, and information of the circuit to be designed;
   a delay time calculator configured to calculate delay times of the low-threshold cells in state that the upper limit electric potential of the virtual ground line is set
   a layout generator configured to generate a layout such that an electric potential of the virtual ground line does not exceed the upper limit electric potential, the layout generated based on the information, the cell library for low-threshold cells, and the cell library for high-threshold cells; and
   a timing analyzer configured to execute a timing analysis to the layout by using the delay times calculated by the delay time calculator.

2. The automatic circuit design apparatus of claim 1, further comprising a cell library generator configured to generate the cell library for low-threshold cells by using the upper limit electric potential.

3. The automatic circuit design apparatus of claim 2, wherein the cell library generator comprises:
   a delay time calculator configured to calculate delay times of the low-threshold cells; and
   a low-threshold cell library generator configured to generate the cell library for low-threshold cells based on the delay times.

4. The automatic circuit design apparatus of claim 1, wherein the setting module comprises:
   a data acquisition module configured to acquire the information, the upper limit electric potential, and a timing constraint; and
   an upper limit setting module configured to set an electric potential of a ground terminal in the low-threshold cell to the upper limit electric potential.

5. The automatic circuit design apparatus of claim 1, further comprising a logic synthesis module configured to provide a logic synthesis to the information, and to generate a net list.

6. The automatic circuit design apparatus of claim 1, further comprising a circuit modification module configured to add some cells to a net list or remove some cells from the net list in accordance with a timing analysis.

7. The automatic circuit design apparatus of claim 1, further comprising a timing analyzer configured to provide a timing analysis to the layout based on the cell library for low-threshold cells, the cell library for high-threshold cells, and a timing constraint.

8. The automatic circuit design apparatus of claim 7, further comprising a modification determination module configured to determine whether there is need to modify a part of the layout in accordance with the timing analysis.

9. The method of claim 1, further comprising providing a timing analysis to the layout based on the cell library for low-threshold cells, the cell library for high-threshold cells, and a timing constraint.

10. An automatic circuit design apparatus comprising:
    a setting module configured to set an upper limit electric potential of a virtual ground line in a circuit to be designed, by use of a cell library for low-threshold cells, a cell library for high-threshold cells and information of the circuit to be designed; and
    a layout generator configured to generate a layout based on the information, the cell library for low-threshold cells, and the cell library for high-threshold cells;
    wherein the setting module comprises:
    a data acquisition module configured to acquire the information, a timing constraint, and a wiring parameter;
    a timing constraint determination module configured to calculate an allowable delay time of each cell by estimating the number of high-threshold cells and low-threshold cells based on the information;
    an on-resistance calculator configured to calculate an on-resistance of switch cells, based on a transistor characteristic and the cell library for high-threshold cells;
    a discharge time calculator configured to calculate the delay time of the low-threshold cells from the discharge time by calculating a discharge time of the low-threshold cells based on the wiring parameter and the on-resistance;
    an upper limit calculator configured to calculate the upper limit electric potential by comparing the allowable delay time with the delay time; and
    an upper limit setting module configured to set an electric potential of a ground terminal in the low-threshold cell to the upper limit electric potential.

11. An automatic circuit design apparatus comprising:
    a setting module configured to set an upper limit electric potential of a virtual ground line in a circuit to be designed, by use of a cell library for low-threshold cells, a cell library for high-threshold cells and information of the circuit to be designed;
    a layout generator configured to generate a layout based on the information, the cell library for low-threshold cells and the cell library for high-threshold cells; and
    a logic synthesis module configured to provide a logic synthesis to the information, and to generate net list;
    wherein the layout generator comprises:
    a placement module configured to place the high threshold cells and the low-threshold cells in the net list, based on the cell library for low-threshold cells, the cell library for high-threshold cells, and a timing constraint, and to generate placement data; a routing module configured to provide a routing process to the placement data, and to generate the layout; and
    a switch cell optimizer configured to optimize the arrangement of switch cells to be 5 connected to the virtual ground line when an electric potential of the virtual ground line exceeds the upper limit electric potential.

12. The automatic circuit design apparatus of claim 11, wherein the placement module comprises:
    a high-threshold cell placement module configured to place flip-flops and the high-threshold cells based on the net list;
    a low-threshold cell placement module configured to refer to the timing constraint, and to replace the high-threshold cells failing to satisfy the timing constraint with the low-threshold cells;
    a switch cell placement module configured to place the switch cell between the virtual ground line and a ground; and
    a resistance minimizer configured to shorten a distance between the switch cell and low-threshold cells, connected to common virtual ground line.

13. The automatic circuit design apparatus of claim 11, wherein the routing module comprises:
 a clock routing module configured to route a clock path to the flip-flops;
 a general routing module configured to route paths to the high-threshold cells, the low-threshold cells, and the switch cells; and
 a virtual ground line optimizer configured to change a connection of a virtual ground line connected to same-stage low-threshold cells to a connection to other-stage low-threshold cells.

14. A method for automatically designing a circuit comprising:
 setting an upper limit electric potential of a virtual ground line in a circuit to be designed, by use of a cell library for low-threshold cells, a cell library for high-threshold cells, and information of the circuit to be designed;
 calculating delay times of the low-threshold cells in state that the upper limit electric potential of the virtual ground line is set;
 generating a layout such that an electric potential of the virtual ground line does not exceed the upper limit electric potential, the layout generated based on the information, the cell library for low-threshold cells, and the cell library for high-threshold cells; and
 executing a timing analysis to the layout by using the delay times calculated by the delay time calculator.

15. The method of claim 14, further comprising generating the cell library for low-threshold cells by using the upper limit electric potential.

16. The method of claim 14, further comprising providing a logic synthesis to the information, and generating a net list.

17. The method of claim 14, wherein the generation of the cell library comprises:
 calculating delay times of the low-threshold cells; and
 generating the cell library for low-threshold cells based on the delay time.

18. A method for automatically designing a circuit comprising;
 setting an upper limit electric potential of a virtual round line in a circuit to be designed, by use of a cell library for low-threshold cells, a cell library for high-threshold cells, and information of the circuit to be designed;
 generating a layout based on the information, the cell library for low-threshold cells, and the, cell library for high-threshold cells: and
 providing a logic synthesis to the information, and generating a net list;
 wherein the generation of the layout comprises:
 placing the high threshold cells and the low-threshold cells in the net list, based on the cell library for low-threshold cells, the cell library for high-threshold cells, and a timing constraint, and generating a placement data;
 routing by the placement data so as to generate the layout; and
 optimizing the arrangement of switch cells to be connected to the virtual ground line when an electric potential of the virtual ground line exceeds the upper limit electric potential.

19. A method for automatically designing a circuit comprising:
 setting an upper limit electric potential of a virtual ground line in a circuit to be designed, by use of a cell library for low-threshold cells, a cell library for high-threshold cells, and information of the circuit to be designed; and
 generating a layout based on the information, the cell library for low-threshold cells, and the cell library for high-threshold cells;
 wherein the setting of the upper limit electric potential comprises:
 acquiring the information, a timing constraint, and a wiring parameter;
 calculating an allowable delay time of each cell by estimating the number of high-threshold cells and low-threshold cells based on the information;
 calculating an on-resistance of switch cells, based on a transistor characteristic and the cell library for high-threshold cells;
 calculating the delay time of the low-threshold cells from the discharge time by calculating a discharge time of the low-threshold cells based on the wiring parameter and the on-resistance;
 calculating the upper limit electric potential by comparing the allowable delay time with the delay time; and
 setting an electric potential of a ground terminal in the low-threshold cell to the upper limit electric potential.

20. A computer program product stored on a computer-readable medium for executing an application for an automatic circuit design apparatus, the computer program product comprising:
 instructions configured to set an upper limit electric potential of a virtual ground line in a circuit to be designed, by use of a cell library for low-threshold cells, a cell library for high-threshold cells, and information of the circuit to be designed;
 instructions configured to calculate delay times of the low-threshold cells in state that the upper limit electric potential of the virtual ground line is set;
 instructions configured to generate a layout such that an electric potential of the virtual ground line does not exceed the upper limit electric potential, the layout generated based on the information, the cell library for low-threshold cells, and the cell library for high-threshold cells; and
 instructions configured to execute a timing analysis to the layout by using the delay times calculated by the delay time calculator.

* * * * *